Dec. 25, 1928.

A. S. FITZ GERALD 1,696,598

PROTECTIVE SYSTEM

Filed April 19, 1922    2 Sheets-Sheet 1

Inventor:
Alan S. FitzGerald,
by Albert E. Davis
His Attorney.

Dec. 25, 1928.                                                    1,696,598
A. S. FITZ GERALD
PROTECTIVE SYSTEM
Filed April 19, 1922          2 Sheets-Sheet 2
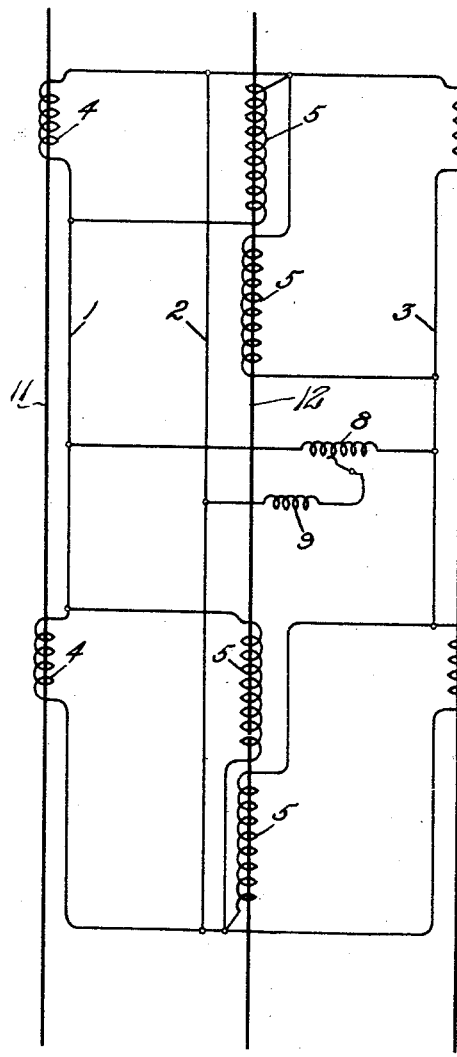
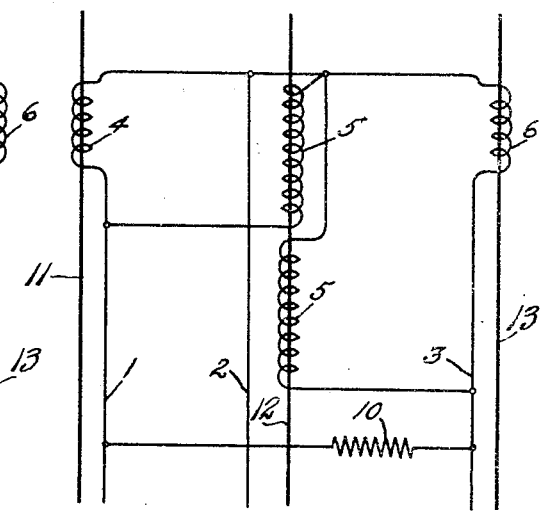
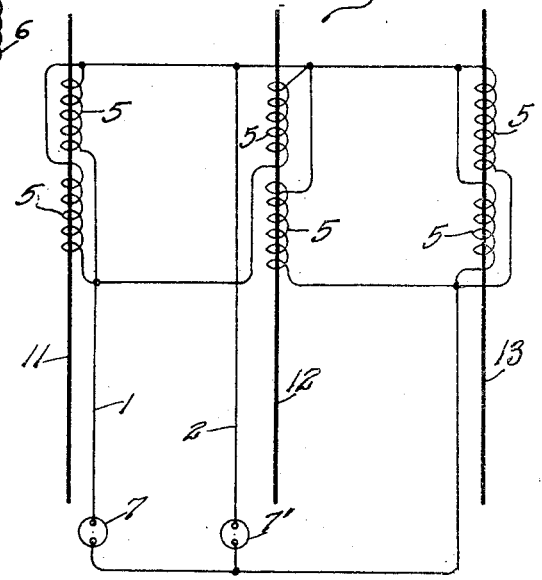
Inventor:
Alan S. FitzGerald,
by Albert G. Davis
His Attorney.

Patented Dec. 25, 1928.

1,696,598

UNITED STATES PATENT OFFICE.

ALAN STEWART FITZ GERALD, OF LONDON, ENGLAND, ASSIGNOR TO GENERAL ELECTRIC COMPANY, A CORPORATION OF NEW YORK.

PROTECTIVE SYSTEM.

Application filed April 19, 1922, Serial No. 555,620, and in Great Britain April 22, 1921.

My invention relates to the protection of alternating current electric systems, and more particularly to protective systems of the type in which the input of electric energy into a section of an alternating current electric system is balanced against the output of the section and has special reference to alternating current electric systems which are earthed at one point An object of my invention is to provide a novel and improved means for protecting an alternating current electric system against faults to earth and faults between conductors such that operation of a separate and distinct nature occurs in accordance with the character of the fault.

My invention will be better understood from the following description, taken in connection with the accompanying drawings, and its scope will be pointed out in the appended claims.

Figure 1:
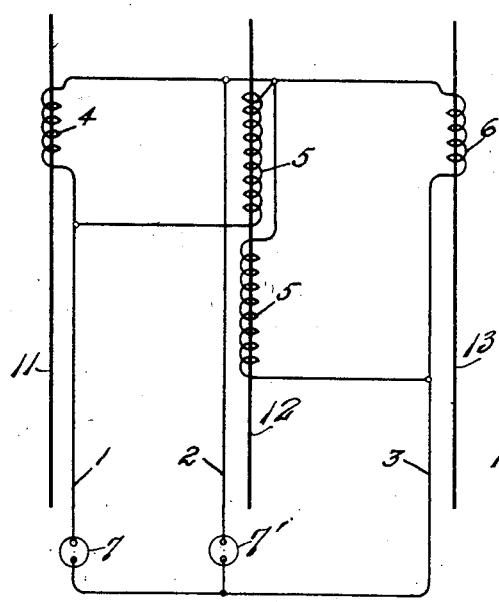

Fig. 1 diagrammatically illustrates an embodiment of my invention, and Figs. 2, 3, 4 and 5 diagrammatically illustrate modifications of my invention.

Referring now to Figs. 1 to 4 inclusive, protective transformers 4, 5 and 6 which may be of the conventional design, associated with current transformers, or may have air gaps incorporated in their magnetic cores, as is usual with systems of protection involving the opposition of electromotive forces, but having the following special features, are employed at each end of the section of the distribution system or apparatus protected.

On two conductors 11 and 13 of a three-phase alternating current line, I provide transformers which may be precisely as described above, but on the other or third conductor 12, I install two transformers 5, each arranged normally to provide a secondary output substantially equal to one-half of the secondary output of each of the transformers 4 and 6. In other words, for like primary currents, the current and the voltage appearing in and across any circuit when supplied by one transformer 4 or 6 will be substantially equal to the current and the voltage appearing in and across the same circuit when supplied by two transformers 5 connected in parallel. For this purpose, each of the transformers 5 may comprise a magnetic core whose cross-sectional area is substantially one-half the cross-sectional area of the cores of each of the transformers 4 and 6, and a secondary winding which has twice as many turns as the secondary windings of each of the transformers 4 and 6, the primary windings of the transformers 4, 5 and 6 being assumed to have the same number of turns herein illustrated as unity. I connect in parallel with each of the secondary windings of the transformers 4 and 6, one winding from the split or double transformers 5 and form a common point at the other end as shown. If leads be connected to each of the junctions between the secondary windings of the transformers 4 and 6 and the secondary windings of the transformers 5, and to the point common to these secondary windings, the former being referred to as leads 1 and 3, and the latter as lead 2, the whole secondary circuit will have the following characteristics.

In Fig. 1, the two leads 1 and 3 and the secondaries of the current transformers 4, 5 and 6 are so connected in a circuit, including apparatus or windings of the requisite nature such as a relay 7, that a current which is equal to the resultant of the currents in the secondaries of the current transformer 4 and one of the current transformers 5 and which is normally equal to the resultant of the currents in the secondaries of the current transformer 6 and the other current transformer 5, circulates in the leads 1 and 3. The lead 2, having in circuit therewith a relay 7', is connected across normally equipotential points of this closed circulating current circuit. Whenever the primary current is reentrant, that is to say, when the vectorial sum of the currents in the phase conductors 11, 12, and 13 is zero, a current equal to the resultant of the currents in either of the pairs of transformers 4, 5 or 5, 6 will flow in the leads 1 and 3, but no current will flow in lead 2. This current will, in case of an interphase fault, tend to increase in accordance with the severity of the fault and upon attaining a value corresponding to the setting of relay 7 will cause operation thereof. Any currents, such as leakage currents, which may be due to a fault to ground for example, and which flow through one or more of the protective transformer primaries at any given instant in the same direction and consequently do not return to their source thereby, will cause a current to flow in lead 2. This will be apparent since in this case the resultant currents of the paired transformers will no longer be equal and, therefore, the points at which the lead 2 is connected not at the same potential. Consequently when the current in lead 2 attains a value corresponding to the setting of relay 7', it will be actuated. With this arrangement of transformers and assuming no leakage currents, the resultant of the currents in the secondaries of the transformer 4 and one of the transformers 5 will be equal to the resultant of the currents in the secondaries of the transformer 6 and the other of the transformers 5, but will differ in phase by 180°. There is, therefore, normally a current, equal to one of said resultant currents, circulating in the circuit including leads 1 and 3 and the secondaries of the transformers 4, 5 and 6, and the relay 7 will operate when, for example due to an interphase fault as between the line conductors 11 and 13, the current circulating in this circuit becomes greater than the predetermined value for which the relay 7 is set. If, however, the vector sum of the currents in the line conductors 11, 12, and 13 is not zero, as in the case of a fault to ground, the vector sum of these resultant currents is not zero since some of the line current returns to the source through a circuit not including the primaries of the transformers 4, 5 and 6. Consequently, the difference between these resultant currents flows in the lead 2, since the points at which the lead 2 is connected to the secondary circuit including leads 1 and 3 are now not at the same potential. The relay 7 may be an over-current relay operative in response to a predetermined excess current such as might result upon the occurrence of a phase fault. The relay 7' may also be an over-current relay having a more sensitive fault responsive setting, as it will normally be deenergized and be operative upon the occurrence of a fault to ground when the leakage current will depend upon the amount of resistance in the neutral to ground connection. Alternatively, as shown in Fig. 5, I may provide, each line conductor with two protective transformers 5 which may be like those described as being installed on the line conductor 12 of Fig. 1, but where these are situated on the two line conductors 11 and 13, I may connect their two windings in parallel. The output of each of the secondaries of the two transformers 5 on the conductor 12 will then normally be one-half the output of the two parallel connected secondaries of the transformers 5 on each of the conductors 11 and 13, and the operation will be exactly as above described.

In order to provide a discriminating protective circuit embracing any section of a distribution system or any machine winding or apparatus, I install either four or six protective transformers, arranged as heretofore described, at each of the points at which electrical energy enters and leaves the section. I may then connect the above transformers together by means of three pilot conductors in such a manner that under normal operation the respective electro-motive forces set up by the primary currents are in opposition, or alternatively, I may connect the transformers at one end in the opposite sense, so that currents will normally circulate between the transformers in the manner associated with the well known circulating current protective systems.

In the former case, I may connect one or more relays or electroresponsive devices 7' in pilot conductor 2 (Fig. 2) and further relays 7 in pilot conductors 1 or 3, or as is convenient, I may divide the windings of my electroresponsive devices and place one portion in line 1 and the remainder in line 3.

Figure 2:
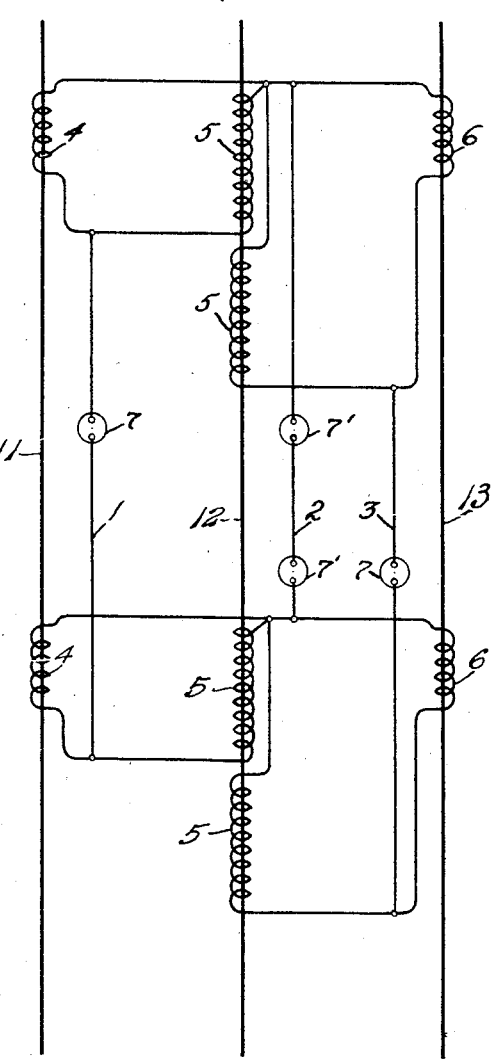

In Fig. 2, I show for a three-phase feeder a protective circuit in which, as described above, the resultant voltage of the secondaries of the current transformer 4 and one of the current transformers 5 at one end of a section of the feeder is arranged through the pilot conductor 1 normally to oppose the resultant voltage of the secondaries of the corresponding current transformers at the other end of the section. Likewise, the resultant voltage of the secondaries of the current transformer 6 and the other current transformer 5 at the one end of the section is arranged through the pilot conductor 3 normally to oppose the resultant voltage of the secondaries of the corresponding current transformers at the other end of the section. The pilot conductor 2 connects the common points of the current transformer secondaries at the two ends of the section. Since these points are always at the same potential when all the current entering the section by the phase conductors 11, 12, 13 leaves the section by the same conductors, that is no leakage to ground in the section, no current flows in the lead 2 and the relays 7' unless there is a ground fault within the section. Where protective transformers are connected for circulating current, I connect between equipotential points on pilot conductors 1 and 3 one or more relays 8, Fig. 3, having their windings so disposed that the midpoints thereof are accessible, and between the same and pilot conductor 2, I may connect a further relay or relays 9. In the former case, as shown in Fig. 2, in which connection is made for opposition of electromotive forces, when the primary currents entering and leaving the protected section are equivalent no current will flow in the secondary or pilot circuit conductors 1 and 3 and relays 7, since the resultants of the secondary voltages of the transformer 4 and one of the transformers 5 and of the transformer 6 and the other of the transformers 5 at one point are opposed by the substantially equal resultant voltages of the corresponding transformers at the other point. This is true not only during normal conditions but also upon the occurrence of through faults, that is faults outside of the section protected by the two interconnected sets of transformers. This will be apparent from the fact that, with a through fault, both sets of transformers are influenced by the same primary currents. Consequently, whether the through fault is a line fault, that is, a fault between phases, or a fault to earth, the electromotive forces of the transformers at one point are opposed by the substantially equal electromotive forces of the transformers at the other point and no current flows in the pilot wires. In the event of a fault between line conductors and within the protected zone, that is the line section between the interconnected sets of transformers, such that there is no flow of primary or line current to earth the balance between the currents tending to be circulated by the two sets of transformers will be disturbed and currents will flow in pilot conductors 1 and 3 only, since with no primary leakage current there is no tendency for either set of transformers to circulate current in the pilot wire 2, as heretofore set forth in connection with the description of Fig. 1. Therefore, the relays 7 which may be referred to as the line fault relays will be actuated. Upon the occurrence of an earth fault in the section or apparatus protected, the set of transformers 4, 5 and 6 between the source and the fault produces a current in pilot wire 2 as heretofore set forth in connection with the description of Fig. 1. The set of transformers beyond the earth fault does not, however, produce a current in pilot wire 2 since at this point the vector sum of the line currents is zero. Consequently, the balance is disturbed and the current flowing in pilot wire 2 actuates the relays 7' which may be referred to as the earth fault relays. In systems of protection which operate on principles involving opposition of electromotive forces and which are applied to the protection of feeders, such that the length of pilot conductor is considerable, it is well known that difficulty is met with on account of currents flowing in the secondary circuit due to the capacity existing between conductors forming the pilot cable, in the event of heavy currents being fed through the protected zone to a fault without the same. The nature of the opposing electromotive forces set up in the secondary circuit incorporated in my invention is such that for all through currents due to remote faults, which do not go to earth, and which in consequence result in a heavy reentrant primary current, the capacity currents present in the secondary circuit flow only in pilot conductors 1 and 3, the earth relay therefore being unaffected. Capacity currents affecting the earth relay can only be caused by a through or earth fault current which in the majority of cases is limited by a resistance installed between the neutral point of the supplying alternator and earth.

From what has heretofore been set forth in connection with the description and operation of the modifications of my invention shown in Figs. 1, 2 and 5, the operation of the modification of my invention shown in Fig. 3 will at once be apparent to those skilled in the art to which my invention pertains. The only material difference between the modifications of my invention as shown in Figs. 2 and 3 is that, whereas in Fig. 2 the two sets of transformers 4, 5 and 6 are interconnected normally to exert opposing electromotive forces, they are in Fig. 3 connected normally to circulate current in the pilot wires 1 and 3. The line fault relay 8, being connected across normally equipotential points, is not energized unless the current output of one set of transformer secondaries differs from the output of the other set as is the case upon the occurrence of a phase fault on the line section between the two sets of transformers. The earth fault relay 9, being connected across the pilot wire 2 and the midpoint of the energizing winding of the relay 8, is normally deenergized and becomes energized only upon the occurrence of an earth fault in the section between the two sets of transformers as normally no current flows in pilot wire 2. With a through earth fault, current will circulate through pilot wire 2 and return through pilot wires 1 and 3 in parallel but, as the output of each set of interconnected transformer secondaries is the same under these conditions and the relay 9 is connected across equipotential points of the pilot wire 2 and the pilot wires 1 and 3, it will not be actuated.

The result of this arrangement is such that a more sensitive setting of the earth relay may be employed without affecting the stability of the same under overload conditions. The settings of the line fault relays may be such that they withstand the capacity currents due to heavy through faults, as no useful purpose is served by providing a sensitve setting for these relays owing to the heavier currents likely to flow due to faults between conductors. In such a system also the earth fault setting is not affected by the nomal component of the charging or capacity currents in the main cables, which flow between the conductors as distinct from the conductors to earth. If in the foregoing system the protective transformers be of the conventional current transformer pattern, having closed magnetic circuits, it is found that more sensitive settings are obtainable when the current transformers are operating at low flux densities, such as those occurring at very small primary loads, and that the sensitivity falls off with increase of load, the setting therefore being more sensitive at no load than at full load. If currents be allowed to flow between pilot conductors 1 and 3 through a suitable resistive or reactive impedance 10 as shown in Fig. 4 due to the same the transformers may be arranged to operate at low flux densities under condition of normal load, whereby the earth fault setting may be considerably improved without appreciable detriment to the line fault setting.

It will be seen that the resistance encountered by secondary currents set up by earth faults is that due to one pilot conductor 2 in series with the two pilot conductors 1 and 3 in parallel, whereas for secondary currents due to line faults, the resistance is equivalent to that of two pilot conductors 1 and 3 in series. In applications where the resistance of the pilot cable has any appreciable effect on the fault settings, therefore, the earth fault setting will be affected to a lesser degree.

What I claim as new and desire to secure by Letters Patent of the United States, is:

1. In a protective arrangement for a three phase alternating current system, current transforming means in each of the three conductors of the system, a secondary circuit including the secondaries of the current transforming means in two of said conductors interconnected with the secondaries of the current transforming means in one of said conductors and the third conductor and arranged to tend to circulate a current in said circuit, a device connected to be responsive to the current in said circuit for protection against phase faults, and a device connected across said secondary circuit to be responsive to the difference in current between conductors of said system for protection against ground faults.

2. In a three phase alternating current electric system a protective arrangement of the type wherein the input of electric energy into a section of the system is normally balanced against the output from said section, current transforming means in each of the three conductors of the system at each end of said section, a secondary circuit interconnecting the secondaries of the transforming means at one end of the section with the secondaries of the transforming means at the other end of the section, the transforming means at each end having the secondaries in one of the conductors interconnected with the secondaries in each of the other conductors to tend to produce in said secondary circuit a circulating current dependent upon the difference between the input and output currents in the conductors of the section, a device connected in said secondary circuit to be responsive to faults between phases, a conductor connecting equipotential points in said secondary circuit at the respective ends of the section, and a device connected in said conductor operative in response to faults to ground on said section.

3. In a three phase alternating current electric system, a protective arrangement including a plurality of protective transformers arranged to be energized respectively in accordance with the currents in the three line conductors, two of said transformers being associated with one of the line conductors and arranged each to have a secondary output substantially one-half the total secondary output of the transformers on each of the other line conductors and one terminal of the secondary of each of said transformers being connected to a common point, a conductor connecting the other terminals of said transformers, and another conductor connecting said common point to said first conductor at a point intermediate the other terminals of the secondaries of said transformers.

4. In a three phase alternating current electric system a protective arrangement of the type wherein the input of electric energy into a section of the system is normally balanced against the output from said section comprising at each end of said section two current transformers on one of the conductors of the system and current transforming means on each of the other conductors of the system having a secondary output substantially twice the output of each of the transformers on said one conductor, one terminal of the transformer secondary windings at each end of said section having a common connection, a pilot wire connecting said common connections, and pilot wires connecting the other terminals of the transformer secondary windings at one end of the section to the other terminals of the transformer secondary windings at the other end of the section for opposing electromotive forces.

5. In a three-phase alternating current electric system a protective arrangement of the type wherein the input of electric energy into a section of the system is normally balanced against the output from said section including a plurality of protective transformers at each end of the section respectively arranged to be energized in accordance with the currents in the three conductors of the system, one terminal of each of the secondary windings of the transformers at each end of said section having a common connection and each of the transformers on one conductor at each end of said section having one-half the total secondary output of the current transformers on each of the other conductors at said ends, a pilot wire connecting said common connections, and pilot wires connecting the other terminals of the transformers at one end to the other terminals of the transformers at the other end.

In witness whereof, I have hereunto set my hand this 5th day of April, 1922.

ALAN STEWART FITZ GERALD.